United States Patent
Cirette et al.

(10) Patent No.: US 9,409,341 B2
(45) Date of Patent: Aug. 9, 2016

(54) DEVICE FOR THE MANUFACTURE OF CONTAINERS COMPRISING A MOULD AND A FLUIDIC COUPLING PLUG FITTED WITH MEANS FOR CLAMPING AGAINST THE MOULD

(71) Applicant: SIDEL PARTICIPATIONS, Octeville sur Mer (FR)

(72) Inventors: Damien Cirette, Octeville sur Mer (FR); Alexandre Rossetti, Octeville sur Mer (FR); Anthony Lepechour, Octeville sur Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 14/402,799

(22) PCT Filed: May 21, 2013

(86) PCT No.: PCT/EP2013/060366
§ 371 (c)(1),
(2) Date: Nov. 21, 2014

(87) PCT Pub. No.: WO2013/174790
PCT Pub. Date: Nov. 28, 2013

(65) Prior Publication Data
US 2015/0132430 A1    May 14, 2015

(30) Foreign Application Priority Data
May 21, 2012  (FR) ..................................... 12 54601

(51) Int. Cl.
*B29C 49/48* (2006.01)
*B29C 49/42* (2006.01)
(Continued)

(52) U.S. Cl.
CPC ......... *B29C 49/4823* (2013.01); *B29C 33/0083* (2013.01); *B29C 33/04* (2013.01);
(Continued)

(58) Field of Classification Search
CPC .... B29C 49/4823; B29C 49/42; B29C 33/04; B29C 2049/4257; B29C 2049/4838; B29C 2049/4856
See application file for complete search history.

(56) References Cited

U.S. PATENT DOCUMENTS

| | | | | |
|---|---|---|---|---|
| 4,518,338 A | * | 5/1985 | Hehl | ..................... B23Q 1/0018 249/102 |
| 5,234,337 A | * | 8/1993 | Hehl | ..................... B29C 45/332 425/589 |

(Continued)

FOREIGN PATENT DOCUMENTS

| | | | |
|---|---|---|---|
| DE | 3717760 A1 * | 2/1988 | .......... B29C 33/0083 |
| FR | 2 122 880 A5 | 9/1972 | |

(Continued)

OTHER PUBLICATIONS

International Search Report, dated Aug. 13, 2013, from corresponding PCT application.

*Primary Examiner* — Robert B Davis
(74) *Attorney, Agent, or Firm* — Young & Thompson

(57) ABSTRACT

A device (10) for the manufacture of containers by blow molding, includes: —a mold (12) equipped with a line for the circulation of a heat transfer fluid, having on an external face (34) of the mold (12) a heat transfer fluid inlet orifice (30) and a heat transfer fluid outlet orifice (32); —a mold carrier (20, 22) in which the mold (12) is removably mounted; —a plug (38) fitted with a duct (40) for conveying the heat transfer fluid and with a duct (42) for removing the heat transfer fluid, the plug (38) being mounted so that it can slide longitudinally on the mold carrier (20, 22) between a position of connection with the orifices (30, 32) of the mold (12) and a position of disconnection of the orifices of the mold, and elements for clamping the plug against the mold in the position of connection.

12 Claims, 10 Drawing Sheets

(51) Int. Cl.
  *B29C 33/04* (2006.01)
  *B29C 33/00* (2006.01)
(52) U.S. Cl.
  CPC ........ *B29C 49/42* (2013.01); *B29C 2049/4257* (2013.01); *B29C 2049/4838* (2013.01); *B29C 2049/4856* (2013.01)

(56) References Cited

U.S. PATENT DOCUMENTS

| | | | |
|---|---|---|---|
| 5,316,347 A * | 5/1994 | Arosio | E02F 3/3654 |
| | | | 285/124.4 |
| 6,343,630 B1 | 2/2002 | Dubinsky | |
| 6,444,159 B2 | 9/2002 | Petre | |
| 6,447,281 B1 | 9/2002 | Petre | |
| 7,258,369 B2 * | 8/2007 | Martin | F16L 37/56 |
| | | | 285/124.4 |
| 2010/0104681 A1 | 4/2010 | Dagorn | |
| 2011/0024952 A1 | 2/2011 | Stoiber et al. | |

FOREIGN PATENT DOCUMENTS

| | | |
|---|---|---|
| FR | 2 903 932 A1 | 1/2008 |
| JP | 06099468 A * | 4/1994 |

* cited by examiner

DEVICE FOR THE MANUFACTURE OF CONTAINERS COMPRISING A MOULD AND A FLUIDIC COUPLING PLUG FITTED WITH MEANS FOR CLAMPING AGAINST THE MOULD

The invention relates more particularly to a device for producing containers by blow molding, the device comprising:

- a mold that comprises a wall defining a molding cavity, the mold being equipped with at least one piping for the circulation of a heat-exchanging fluid, this piping exhibiting an inlet opening for the heat-exchanging fluid and an outlet opening for the heat-exchanging fluid on an external surface of the mold;
- a support in which the mold is mounted in a detachable manner;
- a plug that is equipped with a pipe for supplying heat-exchanging fluid and a pipe for discharging heat-exchanging fluid, with the plug being mounted to slide longitudinally on the support between a front connection position in which the plug is interlocked with the inlet and outlet openings of the mold and in which the supply pipe and the discharge pipe are connected simultaneously with the inlet opening and the outlet opening, respectively, and a rear disconnection position in which the plug is released from the inlet and outlet openings of the mold.

Let us recall that the blow molding of a container takes place in a mold whose wall defines a cavity within which the blank is introduced, the latter—during the blow molding—conforming to the wall under the action of the high gas pressure that prevails within the blank, which is heated in advance in such a way as to make possible its plastic deformation.

It is known to equip the mold with a heat-regulating system. Depending on the applications for which the containers are intended, either the mold is cooled so as to keep its temperature below the glass transition temperature (this is particularly the case in the production of the containers designed to receive still water, with the mold being kept at a temperature of between 20 and 65° C.), or it is heated to temperatures higher than the glass transition temperature so as to impart to the material sufficient crystallinity to render it resistant to deformation during a hot filling (container known as HR, from the English heat-resistant).

Heat regulation is accomplished by circulation of a heat-exchanging fluid (generally it is water or oil) in at least one piping formed in the wall of the container. Depending on whether it is desired to thermally regulate the mold entirely or in part, the piping can be extended over the entire height of the mold or be located in a particular area (for example near the neck or the bottom of the container). The piping generally empties onto an external surface of the mold and has an inlet opening, connected to a pipe for supplying fluid, and an outlet opening, connected to a pipe for discharging fluid, whose circulation is ensured by a pump external to the mold.

During regulating operations, during which the molds are replaced, pipes have to be detached from the mold that is to be removed and then reattached to the new mold.

The U.S. Pat. No. 6,444,159 and U.S. Pat. No. 6,447,281 in the name of Sidel, Inc. illustrate this technology.

It has already been proposed to facilitate the attaching and the detaching of the pipes for supplying and discharging heat-exchanging fluids using a plug equipped with a mechanism for fast connection of the pipes to the mold. Such a solution is illustrated in, for example, the document FR-A-2,903,932.

The invention proposes improving such a plug for performing a still faster connection/disconnection.

The invention also makes it possible to ensure that the connection of the pipes to the mold is correctly carried out.

For this purpose, the invention proposes a device for producing containers by blow molding of the type described above, characterized in that it comprises means for tightening the plug against the mold in a connecting position.

According to other characteristics of the invention:

- The tightening means make it possible to attach the plug to the mold detachably in the connection position;
- The tightening means comprise:
  - A catch that is carried in a stationary manner by the mold in front of the plug when the mold is mounted on the mold carrier; and
  - A tightening pin that is carried in a mobile manner on the plug between a tightening position in which the pin is hooked behind the catch in such a way as to tighten the plug longitudinally against the mold, and a release position in which the pin is offset relative to the catch to make it possible for the plug to slide toward its rear disconnection position;
- in release position, the pin is offset transversely relative to the catch;
- the pin is mounted to pivot around a vertical axis on the plug;
- the pin is returned elastically to its tightening position with a tightening force that is adequate to completely interlock the plug with the inlet and outlet openings of the mold;
- the pin is attached with a lever arm that makes it possible to direct the tightening pin toward its release position when the end of the lever arm is stressed transversely;
- the plug comprises a sliding control stop that is carried in a stationary manner by the plug;
- the tightening pin is held in position by an articulated-lever mechanism that is carried by the plug;
- the tightening pin is controlled in its tightening position by a cam mechanism;
- the mold and the plug are equipped with electrical connecting means comprising at least a first connector carried by the mold and a second additional connector carried by the plug, with the first connector and the second connector being able to be interlocked longitudinally.

Other characteristics and advantages of the invention will appear during the reading of the following detailed description for the comprehension of which reference will be made to the accompanying drawings, among which:

In the description below, elements having an identical structure or analogous functions will be referred to by the same reference numbers.

In the description below, a local reference associated with each mold carrier 20, 22 will be adopted in a non-limiting manner, with each reference comprising the following orientations:

longitudinal, which is indicated by the arrow "L" directed from back to front;

vertical, which is indicated by the arrow "V" directed from bottom to top;

and transverse, which is indicated by the arrow "T" directed from left to right.

The reference letters relative to the first mold carrier 20 will be followed by the index "1" while the reference letters relative to the second mold carrier 22 will be followed by the index "2."

A horizontal plane that is orthogonal to the vertical direction, the vertical direction being common to two mold carriers 20, 22, is also defined.

Figure 1:
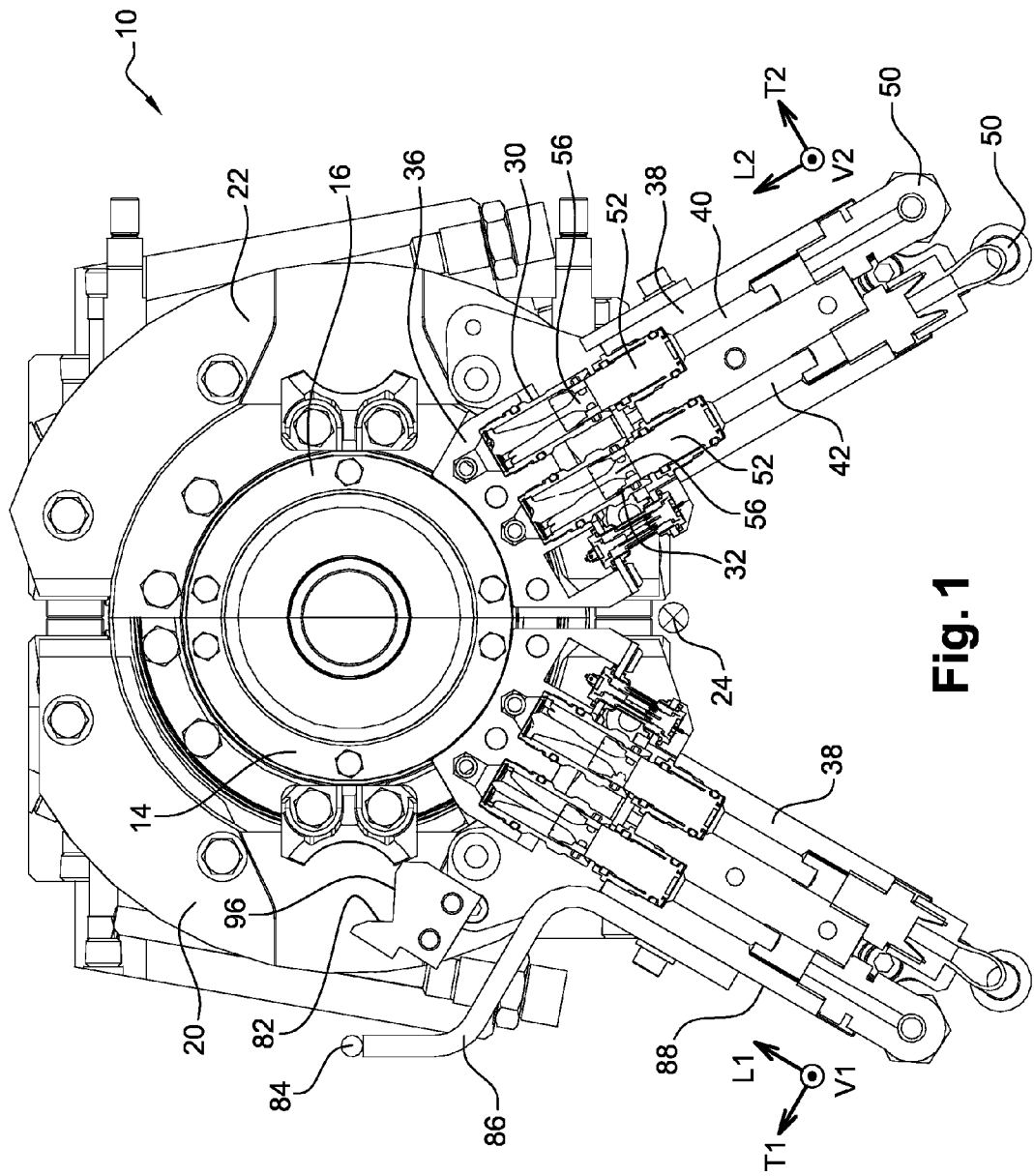
FIG. 1 is a horizontal cutaway view along the cutting plane 1-1 of FIG. 4 that shows connecting plugs with a heat-exchanging fluid circuit in a connection position with a mold according to a first embodiment of the invention.
Figure 4:
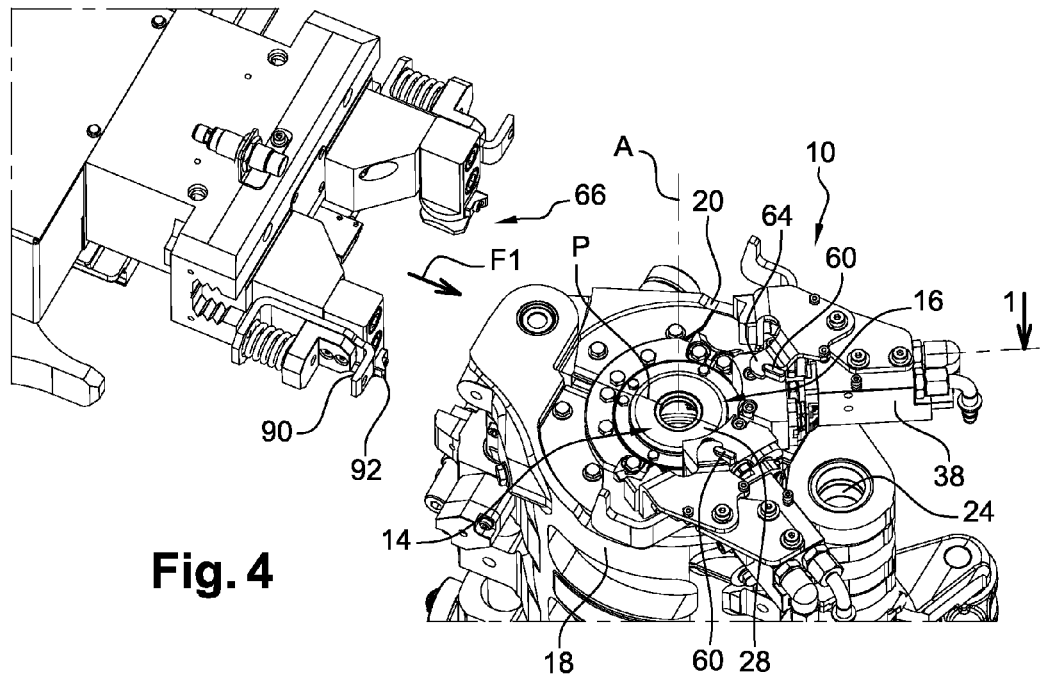
FIG. 4 is a perspective view that shows the mold connected with the plug and an automated replacement clamp of the mold.

FIGS. 1 and 4 show a device 10 for producing containers. This device 10 comprises a mold 12 comprising two essentially symmetrical half-molds 14, 16 that are made of a metal material (generally steel or an aluminum alloy). The two half-molds 14, 16 are able to occupy a position assembled according to a vertical attachment plane "P." The two assembled half-molds 14, 16 together define an overall cylindrical outside wall 18 for revolution around a vertical primary axis "A," and they delimit a cavity (not shown) on an inside surface intended to impart its shape to a container made by blow molding or drawing-blow molding, in the cavity, of a blank made of plastic material that is heated in advance to a temperature that is higher than its glass transition temperature.

Each half-mold 14, 16 is attached in a detachable manner to an associated mold carrier 20, 22. Each half-mold 14, 16 is intended to be received in an associated housing of the associated mold carrier 20, 22 in a horizontal mounting direction that is orthogonal to the attachment plane "P" of the mold 12. The mounting direction forms here an angle of 45° with the longitudinal direction "L1," "L2," of each mold carrier 20, 22.

The mold carriers 20, 22 are articulated along a vertical hinge 24 that is arranged in the same plane as the vertical attachment plane "P" of the mold 12 between a closed position, as illustrated in FIG. 4, in which the mold 12 is assembled, and an open position, not shown, in which the two half-molds 14, 16 are offset to allow the introduction of the blank or the refraction of a finished container. A mold bottom (not shown) is inserted between the two half-molds 14, 16 to form the bottom of the container.

The general structure of such a mold 12, referred to as a wallet mold, is described in the French patent application FR-A-2,856,333 and in the corresponding international application WO-A-05/002820, both in the name of the applicant, to which one skilled in the art can refer.

At an upper end 26, corresponding to a neck of the container to be formed, the mold 12 comprises a plate 28, formed by two symmetrical parts each mounted on a half-mold 14, 16, a plate 28 whose upper surface forms a support surface for a pressurized air intake nozzle (not shown) owing to which the blow molding of the container is carried out.

The mold carriers 20, 22 are configured in such a way as to preserve access to the upper plate 28 of the mold 12.

With the two half-molds 14, 16 and the mold carriers 20, 22 having an identical structure, only one of the half-molds 16 and the associated mold carrier 22 will be described below, with the description being applicable by symmetry to the other half-mold 14 and to the associated mold carrier 20.

Figure 2:
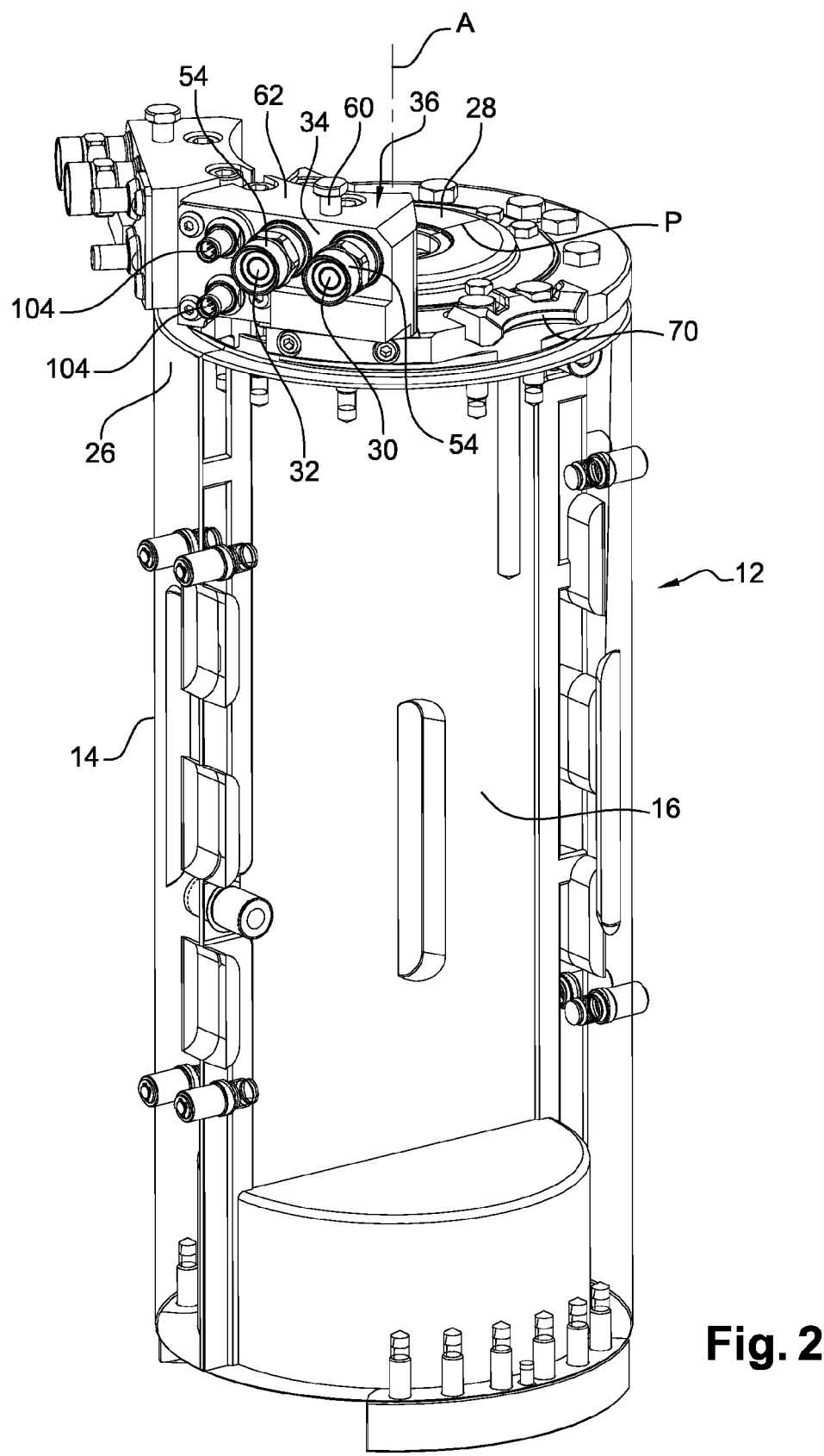
FIG. 2 is a perspective view that shows the mold of FIG. 1 by itself.

As illustrated in FIG. 2, the outside cylindrical wall 18 of the half-mold 16 comprises, on the side of its upper end 26, a piping (not shown) for making possible the circulation in the wall 18 of a heat-exchanging fluid intended to ensure the cooling (or the heating) of the wall 18.

The piping empties outside of the half-mold 16 longitudinally toward the rear into an inlet opening 30, through which is brought the heat-exchanging fluid, and into an outlet opening 32, through which is discharged the heat-exchanging fluid after having carried out a heat exchange with the wall 18. The two openings 30, 32 are arranged on the same vertical transverse plane.

As is shown in FIG. 2, the openings 30, 32 are adjacent. They are each formed by a perforation made in a flat transverse vertical rear surface 34 of a housing 36. The housing 36 is attached to the longitudinal end of the plate 28 in such a way as to be arranged vertically projecting above the plate 28, on the side of the hinge 24.

The device 10 also comprises two plugs 38, each of which is associated with a half-mold 14, 16. With the two plugs 38 being identical by symmetry relative to the attachment plane "P," only a plug 38 will be described below, with the structure and the arrangement of the plug 38 being applicable by symmetry with the other plug 38.

Figure 3:
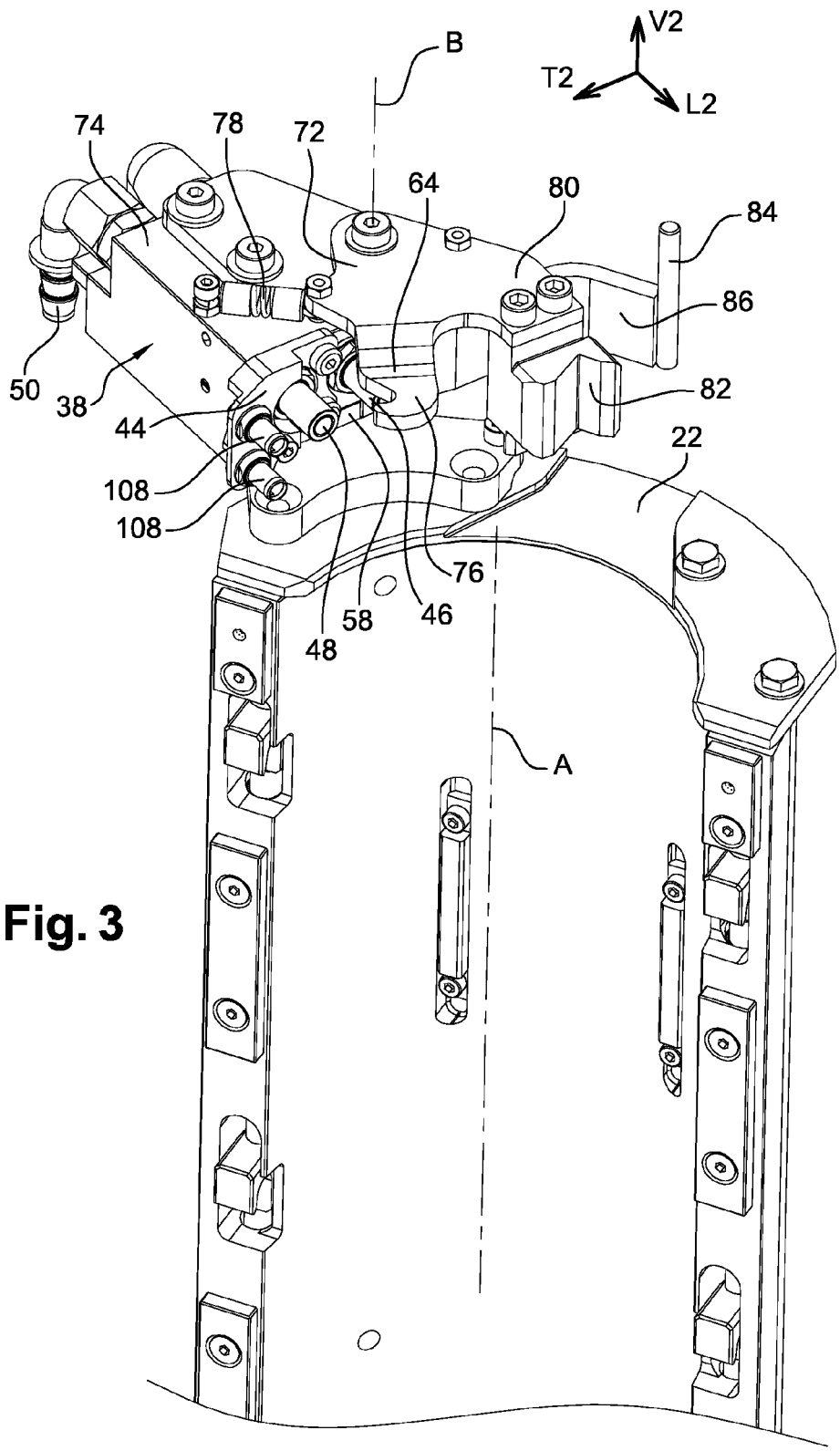
FIG. 3 is a perspective view that shows a mold carrier of FIG. 1 equipped with a plug created according to the teachings of the invention.

As illustrated in FIG. 3, the plug 38 comes in the form of a housing in which are formed a longitudinal pipe 40 for supplying heat-exchanging fluid and a longitudinal pipe 42 for discharging heat-exchanging fluid. The pipes 40, 42 have essentially parallel primary sections 23 that empty longitudinally onto a front surface 44 of the plug 38 in two openings 46, 48 whose distance between centers is equal to that of the openings 30, 32.

Opposite the front surface 44, the pipes 40, 42 are connected to end fittings 50 on which are mounted flexible pipes 30 (not shown), respectively for supplying and discharging heat-exchanging fluid.

As shown in FIG. 1, the plug 38 comprises a system for blocking each pipe 40, 42, which comprises a cylindrical check valve 52 mounted on a rod that extends coaxially to the pipe 40, 42. The check valve 52 has a tapered area that can rest against a complementary tapered check valve seat, formed in the pipe 40, 42. The check valve 52 is mounted to slide on the rod between a blocking position (not shown), in which its area is supported against the check valve seat, thus preventing the circulation of the fluid, and an opening position (FIG. 1), in which the check valve is offset from the seat, thus making possible the circulation of the fluid. The check valve 52 is continuously tensioned by a return spring.

Each half-mold 14, 16 is equipped with a pair of fluidic coupling end fittings 54, each introduced into an opening 30, 32 of the piping. Each end fitting 54, once mounted, projects relative to the rear surface 34 of the housing 36. The end fitting 54 is perforated by a through bore that extends from a free end of the end fitting where it has a tapered shoulder forming a valve seat up to an opposite end of the body where the bore empties into the piping. A valve 56 is mounted to slide in the bore between a blocking position (not shown), in which the valve 56 prevents the passage of heat-exchanging fluid through the bore, and an opening position (FIG. 1), in which the valve 56 makes possible the passage of heat-exchanging fluid through the bore. The valve 56 is continuously tensioned by a return spring toward its blocking position.

The check valves 52 and the valves 56 are directed toward their opening position when the plug 38 is interlocked with the end fittings 54 of the half-mold 16. They resume their blocking position during the release of the plug relative to the half-mold 16.

For a more detailed description of such blocking means, reference can be made to the document FR-A-2,903,932.

Figure 7:
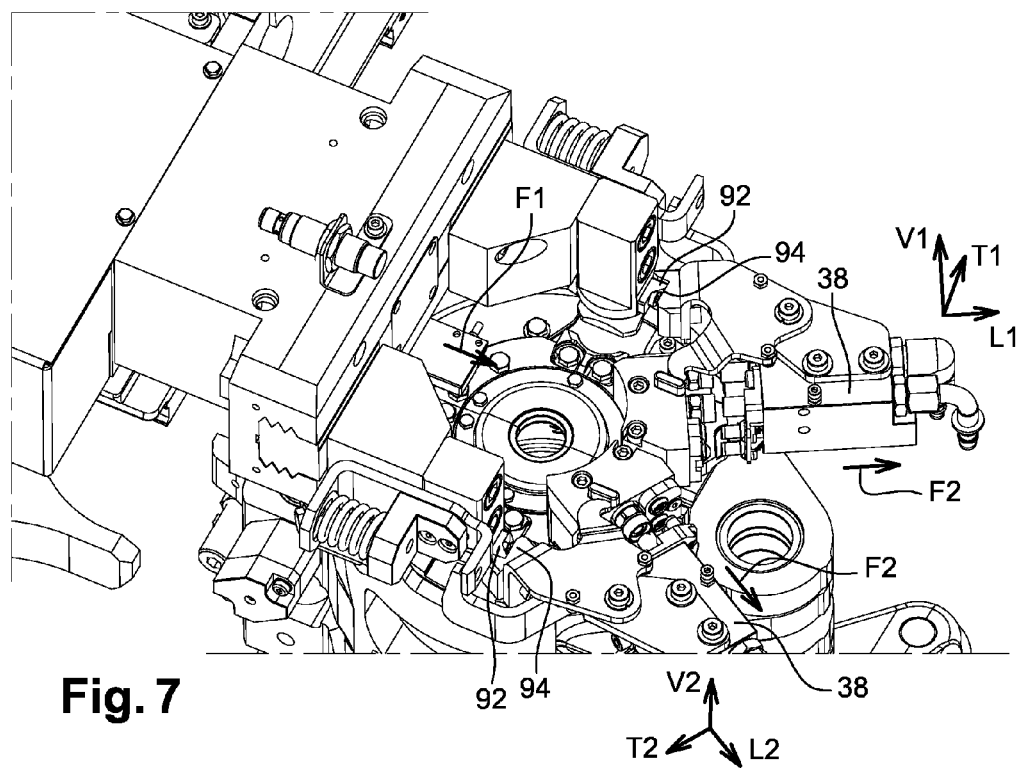

As illustrated in FIG. 3, the plug 38 is mounted to slide longitudinally on a longitudinal rail 58 that is attached to the mold carrier 20, 22 opposite the openings 30, 32 of the half-mold 14, 16. The rail 58 thus extends longitudinally toward the rear in a direction opposite to the vertical axis "A." The plug 38 is thus sliding over the mold carrier 20, 22 between:

A front end connection position in which the plug 38 is interlocked longitudinally with the end fittings 54 of the inlet and outlet openings 30, 32 of the half-mold 16, as illustrated in, for example, FIG. 4, And a rear disconnection position in which the plug 38 is released from the end fittings 54 of the inlet and outlet openings 30, 32 of the half-mold 16, as illustrated in, for example, FIG. 7.

In its front end connection position, the supply pipe 40 and the discharge pipe 42 are simultaneously connected with the inlet opening 30 and the outlet opening 32, respectively, of the half-mold 16 mounted in the mold carrier 22. The connection is carried out simultaneously and in an airtight manner between the supply pipe 40 and the inlet opening 30, on the one hand, and between the discharge pipe 42 and the outlet opening 32, on the other hand. As is illustrated in FIG. 1, the end fitting 54 will push the check valve 52 toward its opening position against its return spring, while the rod pushes the valve 56 toward its opening position against its return spring. In this open configuration, the fluid can freely circulate from the supply pipe 40 toward the piping and then toward the discharge pipe 42 while passing through each bore.

To interrupt the connection between the plug 38 and the associated half-mold 14, 16, it is necessary only to slide the plug 38 longitudinally toward the rear into its rear end disconnection position, as illustrated in, for example, FIG. 7. With the half-mold 14, 16 being attached to its mold carrier 20, 22, only the plug 38 retracts. The check valves 52 and the valves 56 are returned elastically into their blocking position to prevent the heat-exchanging fluid from flowing outside of its circuit.

It is observed that when the plug 38 was not correctly interlocked with the end fittings of the half-mold 14, 16, i.e., when the plug 38 is not pushed toward the front up to its front end connection position, the check valves 52 and the valves 56 are only partially open, which limits the flow of heat-exchanging fluid. As a result, the temperature of the mold 12 can no longer be regulated in an effective manner.

The invention proposes a device 10 that comprises means for tightening the plug 38 against the mold 12 in a connection position to ensure that the check valves 52 and the valves are completely open. These tightening means keep the plug 38 continuously tightened against the mold 12 in its front end connection position, which thus makes possible the detachable attachment of the plug 38 to the mold 12.

As illustrated in particular in FIGS. 3 and 4, the tightening means comprise a catch 60 that is carried in a stationary manner by the half-mold 16 in front of the plug 38 when the half-mold 16 is mounted on the mold carrier 22. As illustrated in the figures, the catch 60 is formed here by a protuberance that projects vertically from an upper surface 62 of the housing 36 of mold 12. Here, the protuberance has an elongated horizontal section in a direction parallel to the attachment plane "P."

The tightening means also comprise a tightening pin 64 that is carried in a mobile manner by the plug 38 between a tightening position in which the pin 64 is hooked behind the catch 60 in such a way as to longitudinally tighten the plug 38 against the mold 12, and a release position in which the pin 64 is offset relative to the catch 60 to make it possible for the plug 38 to slide toward its rear disconnection position, as shown in FIG. 7.

Figure 6:
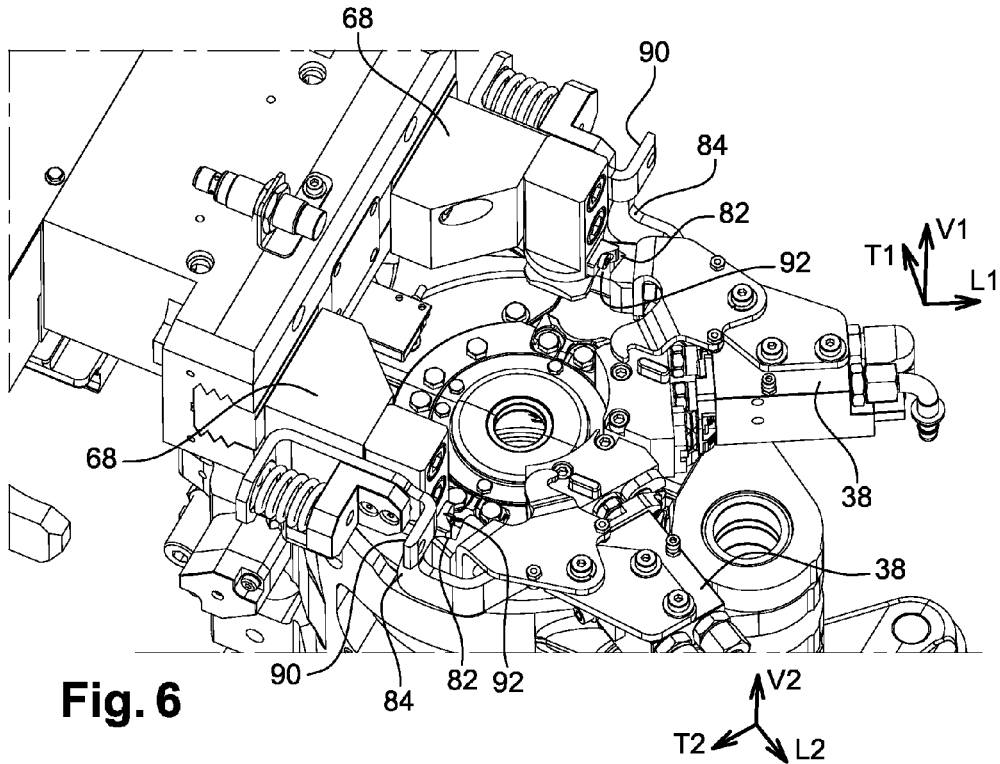

In a general manner, the tightening pin 64 is able to become hooked behind the catch 60 when the plug 38 occupies a position between its front end connection position and a hooking position that is intermediate between its rear end position and its front end position. For example, as illustrated in FIG. 6, in the hooking position, the free ends of the end fittings 54 penetrate the pipes 40, 42 of the plug 38 to a very small extent. This makes it possible to ensure that the plug 38 will be drawn to its front end position by the tightening pin 64 even if it is not completely interlocked with the end fittings 54 of the half-mold 14, 16.

A first embodiment of the invention is shown in FIGS. 1 to 14. This embodiment makes possible a replacement of the molds 12 by automated means.

The automated means comprise a gripping clamp 66 that is equipped with two mobile jaws 68 orthogonally to the attachment plane "P" of the mold 12 between an offset position, as illustrated in FIGS. 6, 7, 8, 12 and 13, and a gripping position of an upper part 70 for gripping the mold 12, in which the jaws 68 are brought close to one another, as illustrated in FIGS. 4, 5, 9, 10, 11 and 14. The part 70 for gripping the mold 12 is arranged in the immediate proximity of the upper plate 28.

The clamp 66 thus makes it possible to keep the mold 12 in its assembled position when it is no longer attached to the mold carriers 20, 22 and also to carry the mold 12 to prevent it from falling when it is detached from the mold carriers 20, 22.

Figure 9:
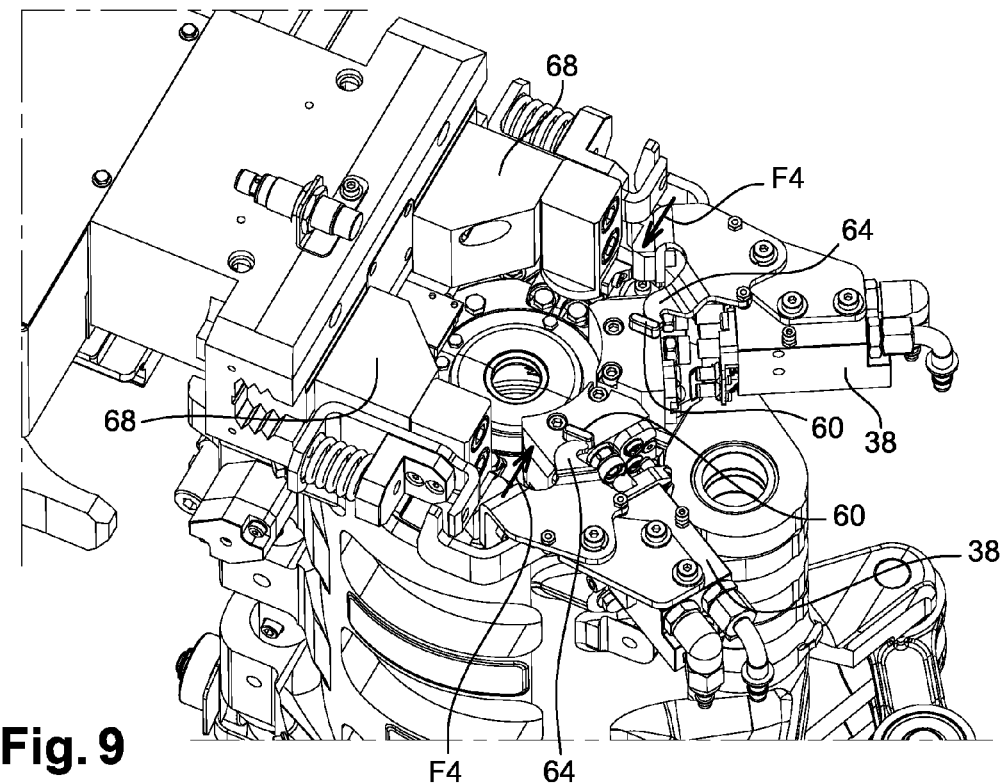
Figure 10:
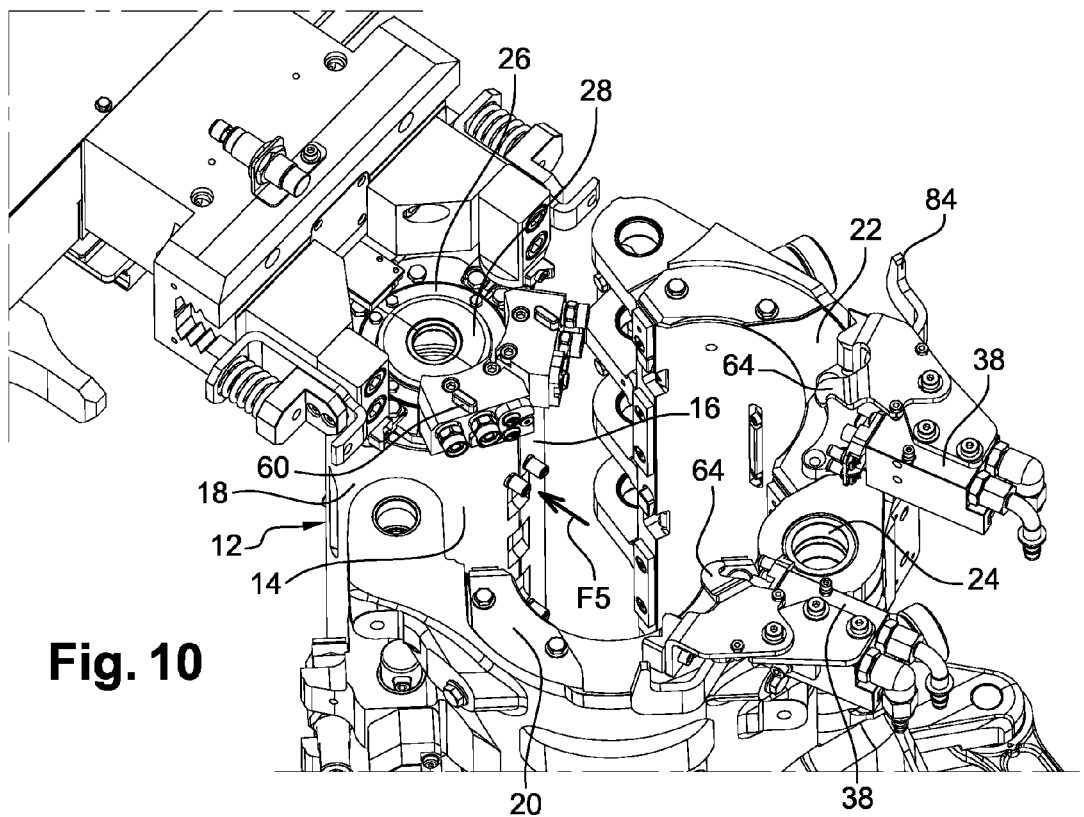

To make possible an easy detachment from the assembled mold 12, the clamp 66 is mobile in a horizontal direction parallel to the attachment plane "P" between a front gripping position, as shown in FIG. 9, and a rear retraction position of the mold 12, as shown in FIG. 10.

Figure 8:
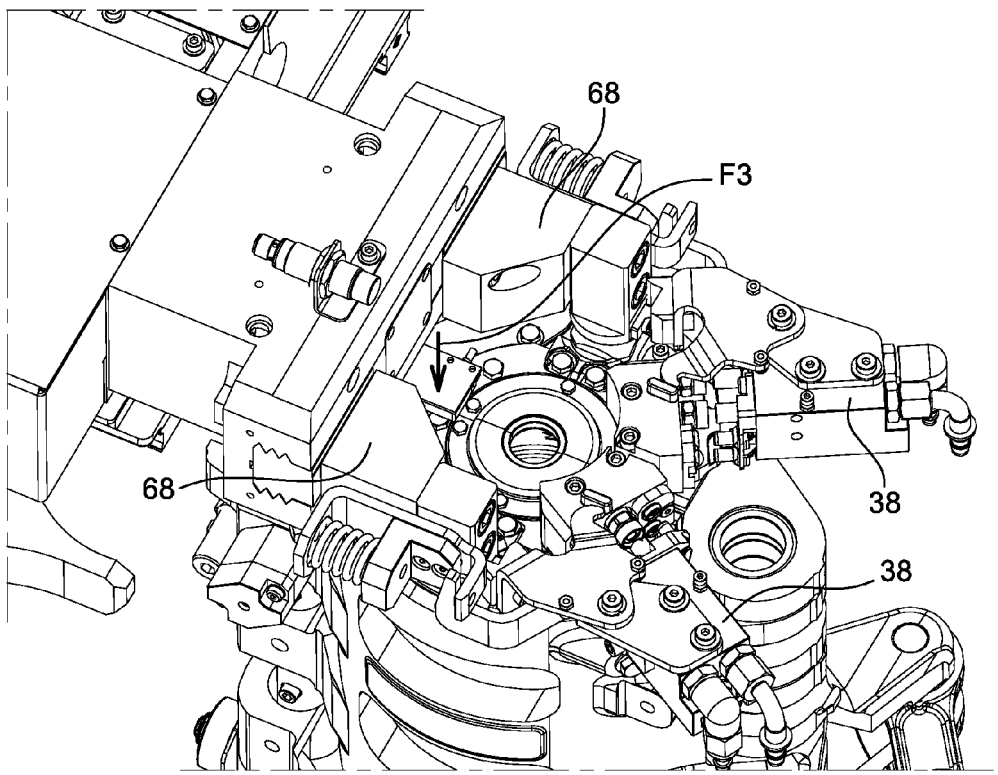

In addition, when the clamp 66 is in its front gripping position, it is able to be driven by a vertical movement between an upper gripping position in which it is arranged above the mold 12, as shown in FIG. 7, and a lower gripping position in which the gripping part 70 of the mold 12 is arranged between the two jaws 68, as illustrated in FIG. 8. This vertical movement makes it possible to pass through the edges of the upper ends of the mold carriers 20, 22, which prevent the horizontal access of the gripping part 70 of the molds 12 when they are in the closed position.

In this first embodiment, the tightening pin 64 has a first rear end 72 that is mounted to pivot around a vertical pivoting axis "B" on the upper surface 74 of the housing of the plug 38 between its end angular tightening position and its end angular release position. The pivoting of the tightening pin 64 between its two end positions is limited by angular stops (not shown).

The pin 64 has a free front end 76 that is curved in the form of a hook in such a way as to be able to be hooked behind the catch 60.

Thus, when the tightening pin 64 occupies its release position, the pin 64 is offset transversely relative to the catch 60 in such a way as to allow the longitudinal sliding of the plug 38 toward its rear disconnection position in which the free end 76 of the tightening pin 64 is arranged longitudinally at the rear of the catch 60.

In this first embodiment, the tightening pin 64 is returned elastically toward its tightening position by means of a spring 78 with an adequate tightening force to interlock the plug 38 completely with the inlet and outlet openings 30, 32 of the mold 12. The tightening force is adequate for sliding the plug 38 up to its front end connection position against the elastic return force of the check valves and the blocking valves toward their closed position. Thus, although the clamp 66 is intended to connect the plug 38 with the mold 12, the tightening pin 64 ensures the connection even in the event of malfunction of the clamp 66.

A lever arm 80 extends horizontally here from the rear end 72 of the tightening pin 64. The lever arm comprises an actuating surface 82 that is able to be tensioned by an actuating head 92 of automatic means for turning the tightening pin 64 toward its release position against the elastic return force.

The lever arm 80 also comprises a vertical stop surface 94 that extends all the way across transversely and that is turned toward the front. The stop surface 94 is designed to be pushed by the actuating head 92 toward the front to direct the sliding toward the front of the plug 38. To prevent the tightening pin 64 from being forced on its angular stops, the stop surface 94 is essentially aligned longitudinally with the axis of rotation "B" of the pin 64.

The stop surface 94 forms an angle bar with the associated actuating surface 82 in such a way that the head 82 is locked in the angle formed between these two surfaces during a disconnection operation.

The lever arm 80 and the tightening pin 64 are attached relative to one another, and they extend essentially in the same horizontal plane. They are formed here of a single part. The tightening pin 64 and the lever arm thus form a lever in which the pivoting axis "B" forms a support point that is inserted between the free end 76 of the tightening pin 64 and the actuating surface 82.

The actuating surface 82 is offset longitudinally here toward the front relative to the pivoting axis "B" of the tightening pin 64 in such a way as to be able to be tensioned by a horizontal actuating force that is directed orthogonally to the attachment plane "P" of the mold 12. The actuating surface 82 extends longitudinally and vertically here.

The plug 38 also comprises a vertical stop 84 for slide control that is attached to the plug 38. The control stop 84 is arranged here at the free end of an arm 86 that extends transversely in a direction opposite to that of the attachment plane "P." The arm 86 is attached to a side wall 88 of the housing of the plug 38.

The stop 84 is able to be drawn longitudinally forward by a vertical drawing surface 90 of the automated means to make possible the return of the plug 38 toward its front connection position. In fact, the connection means exert a drawing force on the stop 84 toward the front in a direction that is parallel to the attachment plane "P" of the mold 12. The drawing force thus comprises a longitudinal component that makes possible the effective movement of the plug 38 toward its front connection position, and a transverse component. Because of the presence of the transverse component, the support between the automated means and the stop 84 is implemented in a sliding manner in the transverse direction.

The stops 84 extend over an adequate vertical height so that the drawing surfaces 90 are able to come into contact with them both in an upper gripping position of the clamp 66 and in a lower gripping position.

To be able to control the position of the plug 38 and the position of the tightening pin 64, each jaw 68 of the clamp 66 carries in a stationary manner an actuating head 92 and a drawing surface 90. Thus, each jaw 68 is able to control the connection or the disconnection of an associated plug 38.

The drawing surface 90 is carried by an angle bar that is attached to an outer lateral surface of each jaw 68, i.e., the surface that is opposite to the other jaw 68. The drawing surface 90 thus extends orthogonally to the attachment plane "P" that projects relative to the jaw 68.

The actuating head 92 is arranged at a front end of each jaw 68. It is intended to tension the actuating surface 82.

The actuating surfaces 82 extend over an adequate vertical height so that the actuating heads 92 are able to come into contact with them both in an upper gripping position of the clamp 66 and in a lower gripping position.

At this time, a process for replacement of a mold 12 by automated means is described with reference to FIGS. 4 to 14.

Figure 5:
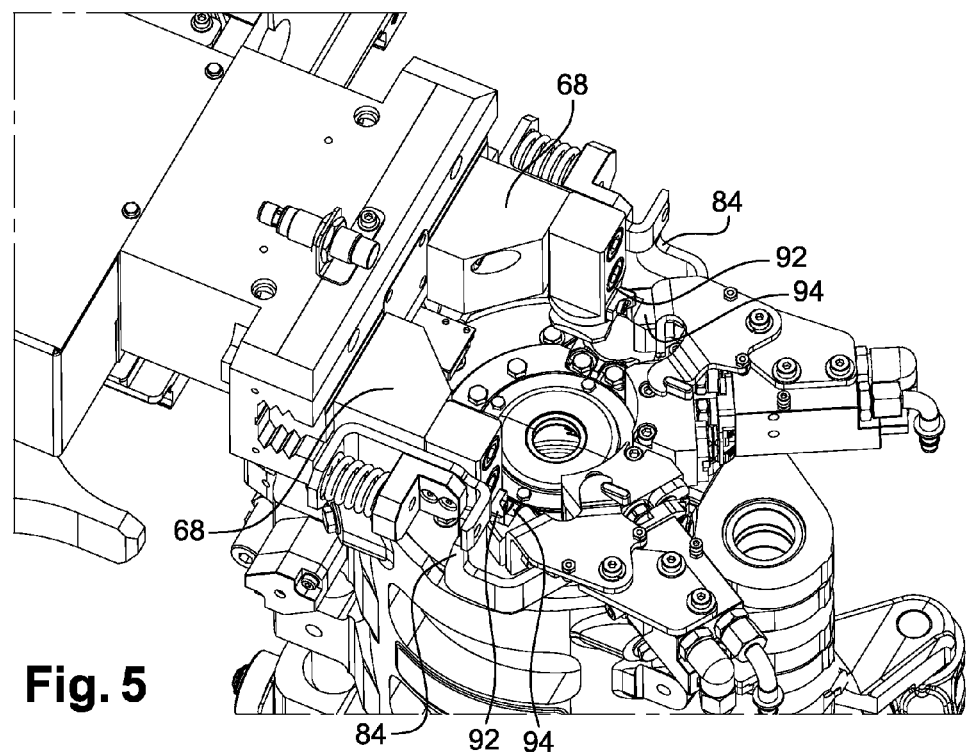
FIGS. 5 to 14 are figures similar to those of FIG. 4 that shows the different stages for replacement of a mold by the clamp, including stages for disconnection of the plug and stages for connection of the plug.

As illustrated in FIGS. 4 and 5, when the mold 12 is in the attached position, the clamp 66 of the automated means advances horizontally, in the direction indicated by the arrow "F1" of FIG. 4 up to an upper actuating position in which the actuating head 92 is close to or against the stop surface 94 but without applying force. The jaws 68 are in their gripping position. The clamp 66 then occupies its upper position.

With the jaws 68 being brought close to one another, the drawing surfaces 90 pass between the two stops 84, while the actuating heads 92 are arranged transversely between the two associated actuating surfaces 82.

The jaws 68 of the clamp 66 are then directed toward their offset position, as illustrated in FIG. 6. The drawing surface 90 of each jaw 68 is then arranged longitudinally behind and opposite the associated stops 84, while the actuating head 92 of each jaw 68 tensions the tightening pins 64 toward their release position by support against the actuating surface 82.

Then the clamp 66, in its offset position, advances up to its upper gripping position that is shown in FIG. 7 in the direction indicated by the arrow "F1." In so doing, the actuating heads 92 push the plugs 38 toward their rear end disconnection position as indicated by the arrows "F2" by resting on the stop surfaces 94 of each plug 38.

The clamp 66 is then lowered by vertical sliding toward its lower gripping position, as illustrated by the arrow "F3" in FIG. 8. The clamp 66 is then closed in its gripping position, as is illustrated by the arrows "F4" in FIG. 9. The detachable attachment device of the half-molds 14, 16 is controlled in such a way as to disengage the mold 12 from the mold carriers 20, 22.

The pins 64 are then returned elastically toward their tightening position. With the plugs 38 being in their rear disconnection position, the tightening pins 64 are arranged in front of the associated catch 60. The mold carrier 20, 22 can therefore be opened without the catches 60 being hooked by the pins 64, as shown in FIG. 10.

The mold carriers 20, 22 are open. The clamp 66 then retracts the mold 12 in a retraction movement indicated by the arrow "F5." With the clamp 66 occupying its gripping position and the mold carriers 20, 22 being in their open position, the drawing surfaces pass again between the two stops 84, thus leaving the plugs 38 in their rear disconnection position.

Figure 11:
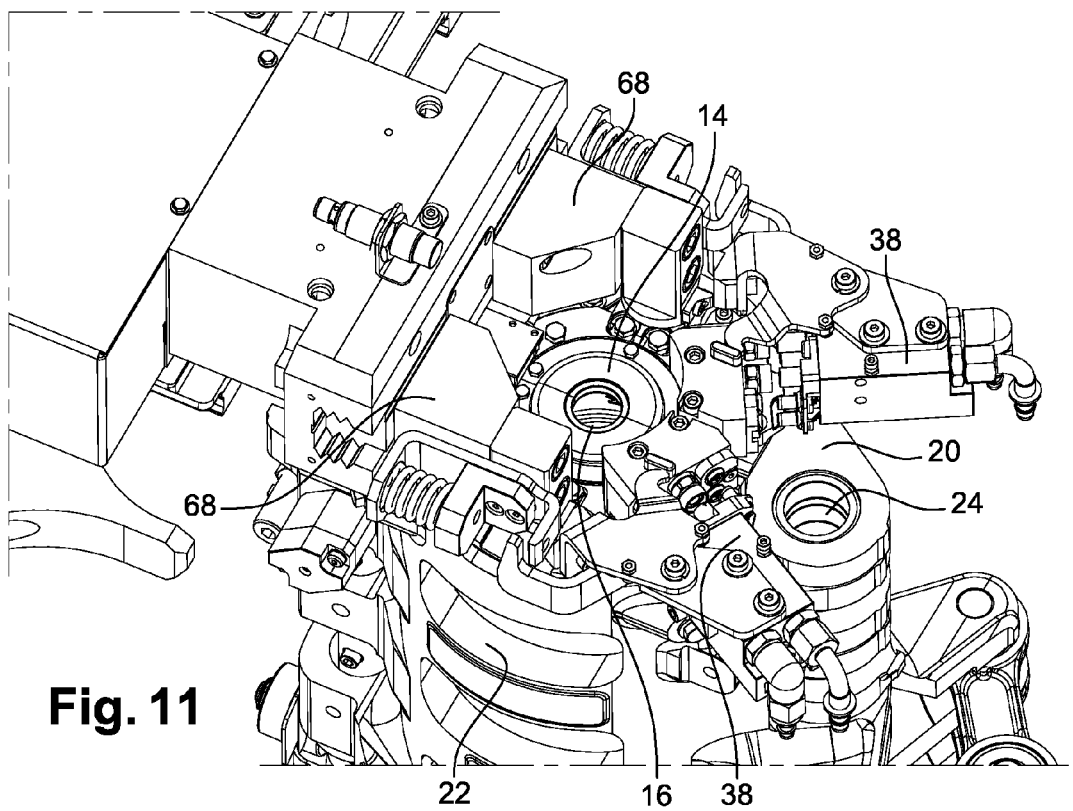

Then, a replacement mold 12 is provided by the clamp 66 or by another identical clamp 66. The mold carriers 20, 22 are closed on the replacement mold 12, and the detachable attachment means are controlled in such a way as to attach each half-mold 14, 16 with the associated mold carrier 20, 22, as shown in FIG. 11.

Figure 12:
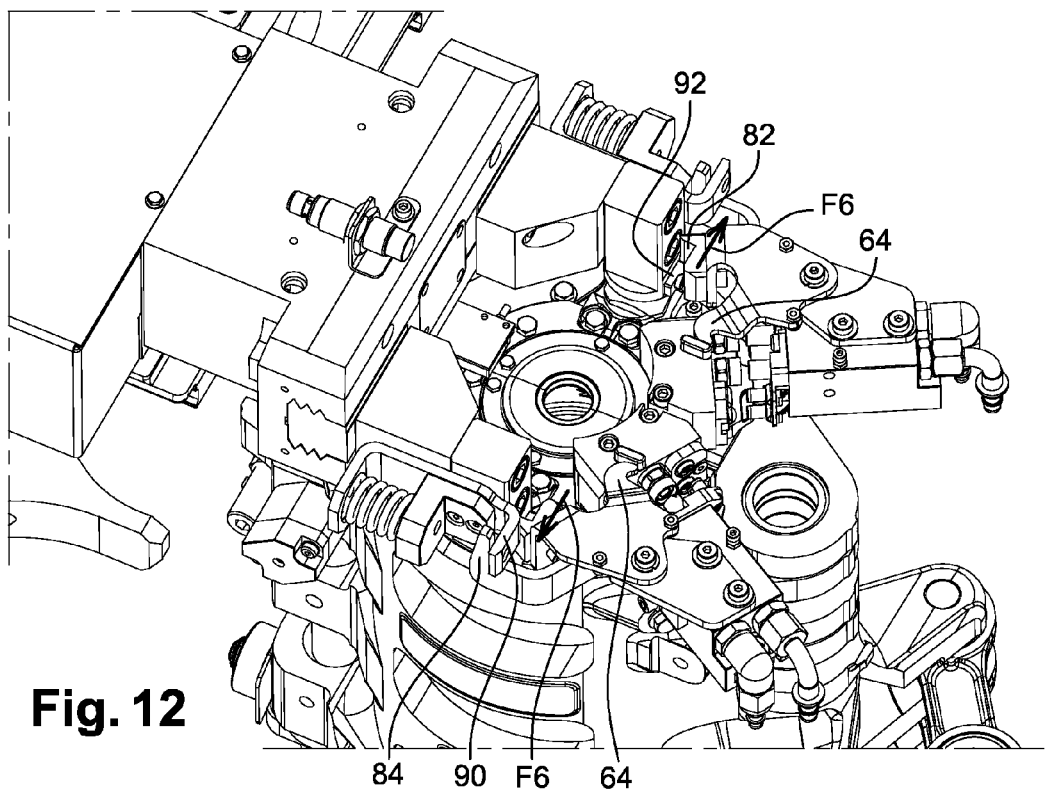

The clamp 66 is then directed toward its offset position, as illustrated by the arrows "F6" in FIG. 12. Thus, the actuating heads 92 again tension the tightening pins 64 toward their release position, while the drawing surfaces 90 are arranged longitudinally behind and opposite the stops 84.

Figure 13:
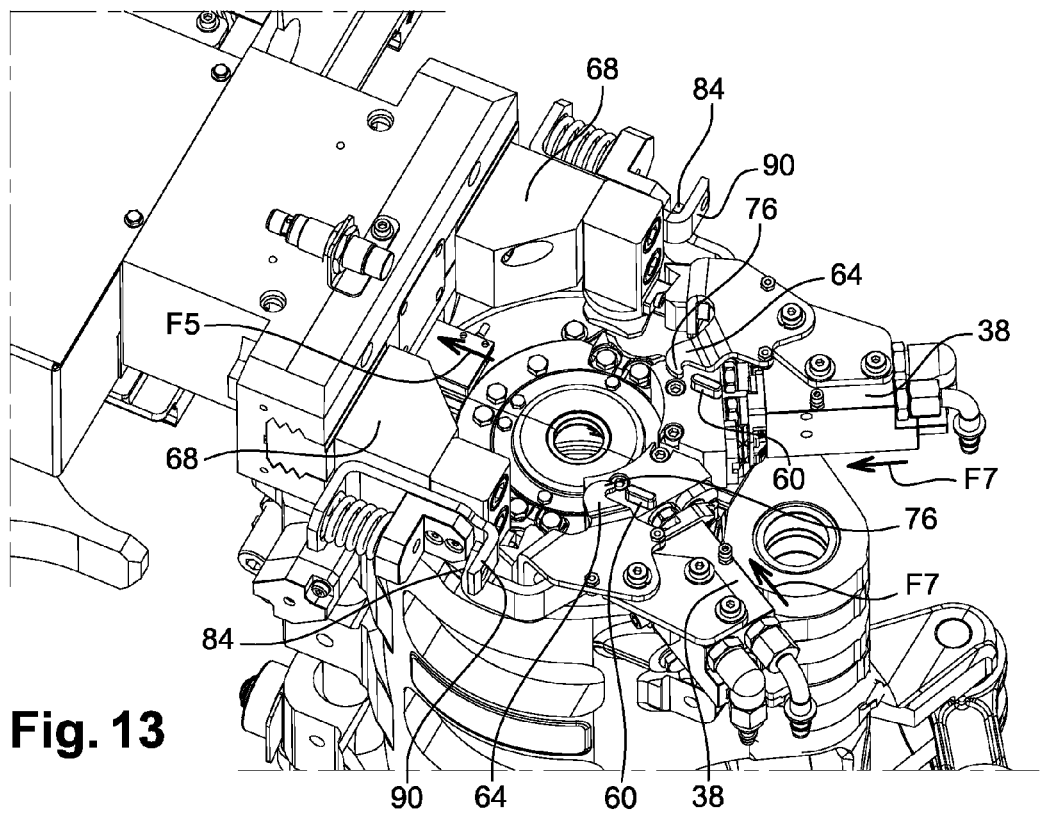

The clamp 66 is moved, still in its offset position, toward its upper gripping position, and it is then retracted toward its initial position as indicated by the arrow "F5" of FIG. 13. By advancing, the drawing surface 90 of each clamp 66 longitudinally draws each stop 84 toward the front, which entrains the movement of the plug 38 toward its front connection position, as shown by the arrows "F7" in FIG. 13. The hooked end 76 of the tightening pins 64 is then arranged in front of the catches 60.

Figure 14:
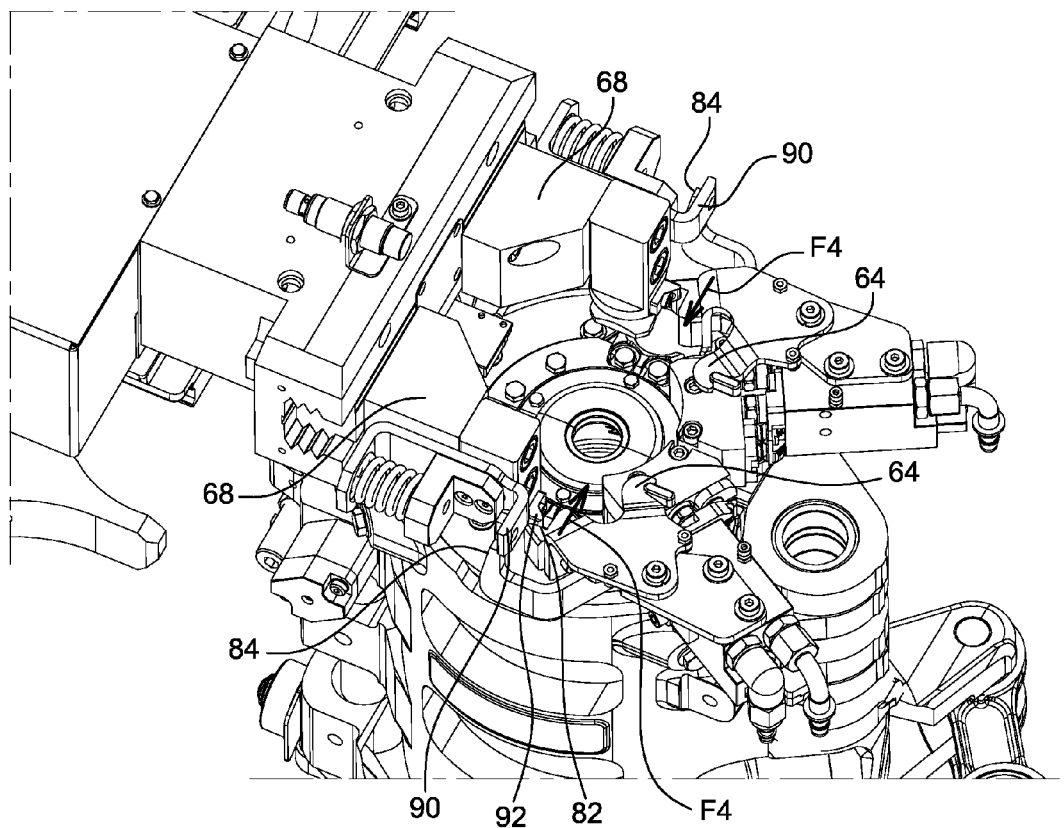

The clamp 66 is then directed toward its gripping position, as indicated by the arrows "F4" of FIG. 14, in such a way as to release the drawing surfaces 90 of the stops 84. In so doing, the actuating heads 92 cease to tension the tightening pins 64. The latter are then returned elastically toward their tightening position, as illustrated in FIG. 14.

With the plug 38 being in its front end connection position or at the very least close to its front end connection position, the tightening pins 64 hook the catches 60 and tighten the plug 38 longitudinally against the mold 12, thus ensuring that the plug 38 occupies its front end connection position.

The clamp 66 can then be retracted horizontally without drawing the stops 84.

Figure 15:
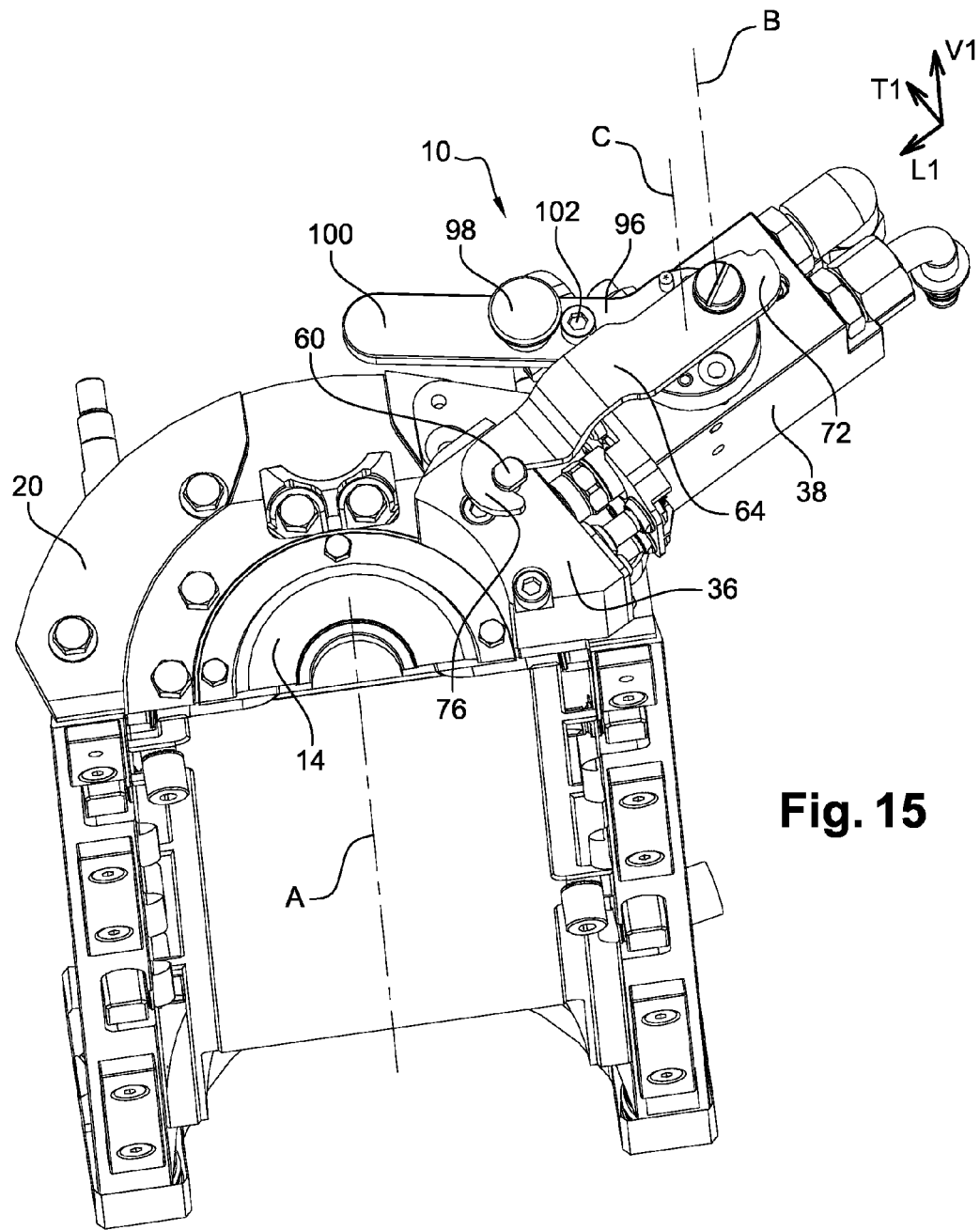
FIG. 15 is a perspective view that shows a variant embodiment in which the plug is tightened manually against the mold.

A second embodiment of the invention was shown in FIG. 15. This embodiment is designed here to be actuated manually by an operator.

The device 10 for production is similar to the one of the first embodiment. Only the differences with the first embodiment will be described below.

In this device 10, the plug 38 does not comprise a stop 84. It will be possible, however, to provide a handle so that the operator can make the plug 38 slide more easily toward its rear end position.

In this second embodiment, the tightening pin 64 is not returned elastically toward its tightening position. By contrast, the tightening pin 64 is able to be actuated and held in position by an articulated-lever mechanism that is carried by the plug 38.

A crank 96 is mounted to rotate on the upper surface of the plug 38 around a vertical axis of rotation "C." A control button 98 for the crank is arranged on a radial arm 100 of the crank 96. The rear end 72 of the tightening pin 64 is mounted to pivot on an upper surface of the crank 96 around a pivoting axis "B." The pivoting axis "B" of the pin 64 is mounted close to the axis of rotation "C," but in an offset manner radially relative to the latter.

The crank 96 also comprises a piece 102 that extends vertically from the upper surface of the crank 96 close to its axis of rotation "C" in such a way that the piece 102 is able to come into contact with an edge of the tightening pin 64 during the rotation of the crank 96.

When the pin 64 occupies its tightening position, its pivoting axis "B" is arranged longitudinally behind the axis of rotation "C" of the crank 96, as is shown in FIG. 15. The pivoting axis "B" is slightly offset transversely in such a way as to abut against the piece 102. This position makes it possible to impart stability to the tightening position without the possibility of untightening the pin 64. The piece 102 is then arranged longitudinally between the pivoting axis "B" and the axis of rotation "C."

When an operator wants to direct the tightening pin 64 toward its release position, he rotates the crank in such a way as to pass the piece 102 longitudinally behind the pivoting axis "B." The piece 102 then pushes the tightening pin 64 in such a way as to make it pivot toward its release position, helped in this by the rotation of the pivoting axis "B" around the axis of rotation "C" of the crank 96.

According to a variant of the invention that is applicable to any of the embodiments, the tightening pin is controlled in its tightening position by a cam mechanism.

In the embodiments shown in the figures, the mold 12 comprises instrumentation, such as a temperature probe, which requires a power supply. For this purpose, the mold 12 is equipped with first electrical connectors 104 in the form of metal sleeves that are shrunk-on in two perforations made in the front surface 34 of the housing 36 of each half-mold 14, 16, as is shown in, for example, FIG. 2. The first connectors 104 are arranged in the immediate vicinity of the end fittings 54.

As fluidic supply, the power supply of the mold 12 is carried out via the plug 38, which is equipped with second electrical connectors 108 that, when the plug 38 is coupled to the mold 12, are interlocked in the first complementary connectors 104.

Each second connector 108 is connected to an electrical cable (not shown) that ensures the connection with an electrical generator external to the device 10.

The device 10 produced according to the teachings of the invention makes it possible to ensure a complete interlocking of the plug 38 on the mold 12. The tightening means also make it possible to attach the plug 38 to the mold 12 in a detachable manner.

In addition, the tightening means produced according to the first embodiment of the invention make it possible to produce an entirely automatic replacement of the mold 12.

The invention claimed is:

1. Device (10) for producing containers by blow molding, the device (10) comprising:
    a mold (12) that comprises a wall defining a molding cavity with a vertical axis (A), the mold (12) being equipped with at least one piping for circulation of a heat-exchanging fluid, the at least one piping having an inlet opening (30) for the heat-exchanging fluid and an outlet opening (32) for the heat-exchanging fluid on an external surface (34) of the mold (12);
    a mold carrier (20, 22) in which the mold (12) is mounted in a detachable manner;
    a plug (38) that is equipped with a supply pipe (40) for supplying the heat-exchanging fluid and a discharge pipe (42) for discharging the heat-exchanging fluid, with the plug (38) being mounted to slide longitudinally on the mold carrier (20, 22) between a front connection position in which the plug (38) is interlocked with the inlet and outlet openings (30, 32) of the mold (12) and in which the supply pipe (40) and the discharge pipe (42) are connected simultaneously with the inlet opening (30) and the outlet opening (32), respectively, and a rear disconnection position in which the plug (38) is released from the inlet and outlet openings (30, 32);
    means for tightening the plug (38) against the mold (12) in a connection position; and
    means, separate from said means for tightening, for drawing the plug longitudinally toward the front connection position.

2. Device (10) according to claim 1, wherein the tightening means make it possible to attach the plug (38) to the mold (12) detachably in the connection position.

3. Device (10) according to claim 2, wherein the tightening means comprise:
    a catch (60) that is carried in a stationary manner by the mold (12) in front of the plug (38) when the mold (12) is mounted on the mold carrier (20, 22); and
    a tightening pin (64) that is carried in a mobile manner on the plug (38) between a tightening position in which the pin (64) is hooked behind the catch (60) in such a way as to tighten the plug (38) longitudinally against the mold (12), and a release position in which the pin (64) is offset relative to the catch (60) to make it possible for the plug (38) to slide toward its rear disconnection position.

4. Device (10) according to 3, wherein in release position, the pin (64) is offset transversely relative to the catch (60).

5. Device (10) according to claim 4, wherein the pin (64) is mounted to pivot around a vertical axis (B) on the plug.

6. Device (10) according to claim 3, wherein the pin (64) is returned elastically toward its tightening position with an adequate tightening force to interlock the plug (38) completely with the inlet and outlet openings (30, 32) of the mold (12).

7. Device (10) according to claim 6, wherein the pin (64) is attached with a lever arm (80) that makes it possible to direct the tightening pin (64) toward its release position when the end (82) of the lever arm (80) is tensioned transversely.

8. Device (10) for producing containers by blow molding, the device (10) comprising:
- a mold (12) that comprises a wall defining a molding cavity with a vertical axis (A), the mold (12) being equipped with at least one piping for the circulation of a heat-exchanging fluid, the at least one piping having an inlet opening (30) for the heat-exchanging fluid and an outlet opening (32) for the heat-exchanging fluid on an external surface (34) of the mold (12);
- a mold carrier (20, 22) in which the mold (12) is mounted in a detachable manner;
- a plug (38) that is equipped with a supply pipe (40) for the supplying heat-exchanging fluid and a discharge pipe (42) for discharging the heat-exchanging fluid, with the plug (38) being mounted to slide longitudinally on the mold carrier (20, 22) between a front connection position in which the plug (38) is interlocked with the inlet and outlet openings (30, 32) of the mold (12) and in which the supply pipe (40) and the discharge pipe (42) are connected simultaneously with the inlet opening (30) and the outlet opening (32), respectively, and a rear disconnection position in which the plug (38) is released from the inlet and outlet openings (30, 32); and
- means for tightening the plug (38) against the mold (12) in a connection position,
- wherein the plug (38) comprises a sliding control stop (84) that is carried in a stationary manner by the plug (38).

9. Device (10) according to claim 3, wherein the tightening pin (64) is held in position by an articulated-lever mechanism that is carried by the plug (38).

10. Device (10) for producing containers by blow molding, the device (10) comprising:
- a mold (12) that comprises a wall defining a molding cavity with a vertical axis (A), the mold (12) being equipped with at least one piping for the circulation of a heat-exchanging fluid, the at least one piping having an inlet opening (30) for the heat-exchanging fluid and an outlet opening (32) for the heat-exchanging fluid on an external surface (34) of the mold (12);
- a mold carrier (20, 22) in which the mold (12) is mounted in a detachable manner;
- a plug (38) that is equipped with a supply pipe (40) for supplying the heat-exchanging fluid and a discharge pipe (42) for discharging the heat-exchanging fluid, with the plug (38) being mounted to slide longitudinally on the mold carrier (20, 22) between a front connection position in which the plug (38) is interlocked with the inlet and outlet openings (30, 32) of the mold (12) and in which the supply pipe (40) and the discharge pipe (42) are connected simultaneously with the inlet opening (30) and the outlet opening (32), respectively, and a rear disconnection position in which the plug (38) is released from the inlet and outlet openings (30, 32); and
- means for tightening the plug (38) against the mold (12) in a connection position, wherein the tightening means comprise,
  - a catch (60) that is carried in a stationary manner by the mold (12) in front of the plug (38) when the mold (12) is mounted on the mold carrier (20, 22), and
  - a tightening pin (64) that is carried in a mobile manner on the plug (38) between a tightening position in which the pin (64) is hooked behind the catch (60) in such a way as to tighten the plug (38) longitudinally against the mold (12), and a release position in which the pin (64) is offset relative to the catch (60) to make it possible for the plug (38) to slide toward its rear disconnection position, and
- wherein the tightening pin (64) is controlled in its tightening position by a cam mechanism.

11. Device (10) according to claim 1, wherein the mold (12) and the plug (38) are equipped with electrical connection means comprising at least a first connector (104) carried by the mold and a second complementary connector (108) carried by the plug (38), with the first connector (104) and the second connector (108) being able to be interlocked longitudinally.

12. Device according to claim 1, wherein said means for drawing the plug longitudinally toward the front connection position comprises a vertically oriented stop (84) attached to the plug (38) and configured to engage a vertical drawing surface (90) of a gripping clamp (66) for the mold.

* * * * *